Dec. 11, 1934.  B. H. MESSERSMITH  1,984,226
ANTISKID CHAIN
Filed May 17, 1934
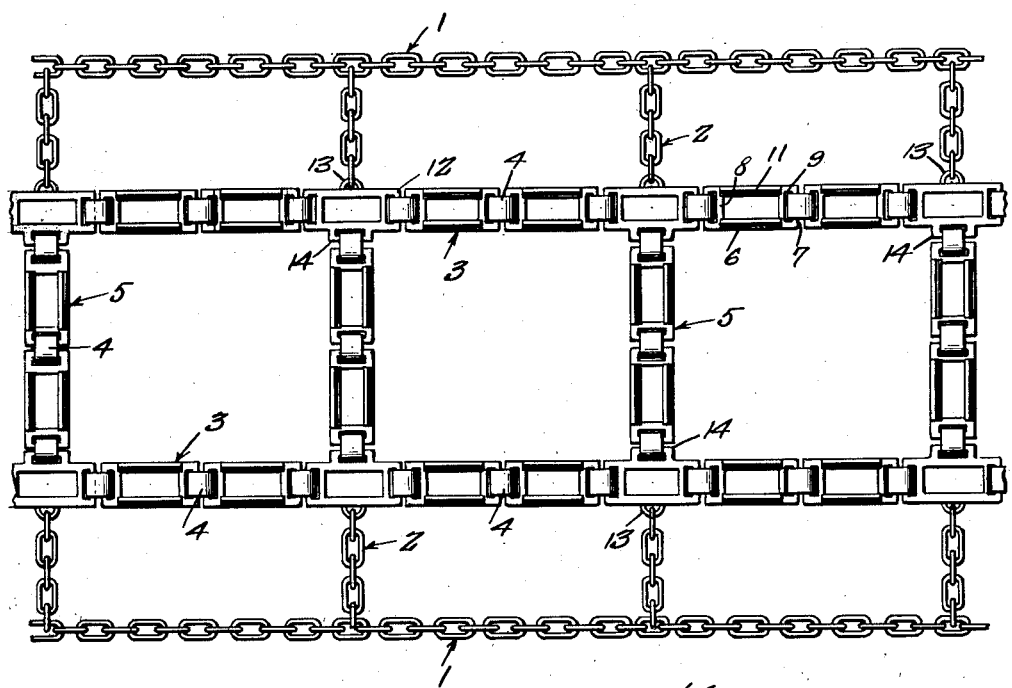
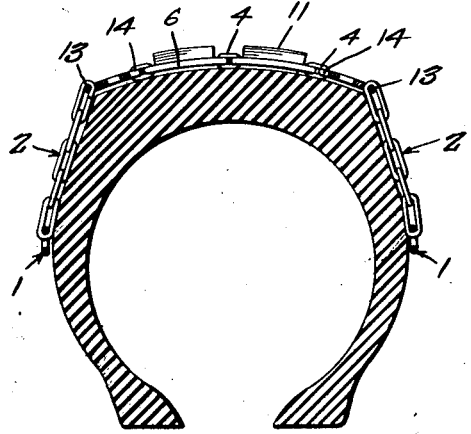
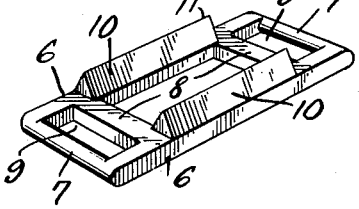
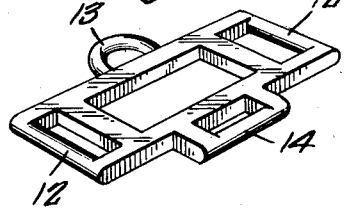
Brainard H. Messersmith,
INVENTOR
BY Victor J. Evans & Co.
ATTORNEY
WITNESS:

Patented Dec. 11, 1934

1,984,226

UNITED STATES PATENT OFFICE 1,984,226

ANTISKID CHAIN

Brainard H. Messersmith, Washington, D. C.

Application May 17, 1934, Serial No. 726,146

1 Claim. (Cl. 152—14)

This invention relates to antiskid chains and its general object is to provide an antiskid chain for vehicle tires that includes plates constructed and arranged with respect to each other to provide ample traction and to prevent lateral skidding regardless of the condition of the roadway.

Another object of the invention is to provide an antiskid chain including plates and connecting means therefor, that have flat tire engaging surfaces, with the result damage to the tire thereby is practically impossible.

A further object of the invention is to provide an antiskid chain having plates with ground penetrating means, and the plates are connected so that the ground penetrating means is capable of performing its intended function without interference from the remaining elements of the chain, therefore, proper traction and non-skidding qualities of the chain are assured.

A still further object of the invention is to provide an antiskid chain that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:

Figure 1 is a fragmentary plan view illustrating a portion of my antiskid chain.

Figure 2 is a transverse sectional view taken through a vehicle tire with my chain applied thereto.

Figure 3 is a perspective view of one of the calk carrying link plates.

Figure 4 is a similar view of one of the connecting link plates.

Referring to the drawing in detail, it will be noted that I have provided an antiskid chain that is adapted to encircle a vehicle tire, and any well known means may be employed for securing the ends of the chain together. I provide side chains 1 that are made up of a plurality of links of the usual construction and arranged at equidistantly spaced intervals in the circumference of the side chains are short pieces of chains formed from links similar to the side chains, and these short pieces of chains may be termed link cross chains, which are indicated by the reference numeral 2.

I also employ what may be termed intermediate circumferentially disposed chains 3 and each of the chains 3 are made up of plate links of the type as shown in Figures 3 and 4, and connecting strip links 4. Bridging the intermediate circumferentially disposed chains 3 are intermediate cross chains 5 which are made up of plate links of the type as shown in Figure 3 and connecting strip links 4.

The plate link, as best shown in Figure 3, is of elongated or rectangular formation and includes side bars 6, end cross pieces 7 and inner cross pieces 8, the latter cooperating with the end cross pieces 7 to provide slots 9 to receive connecting strip links 4, for a purpose which will be presently apparent. The plate links, as shown in Figure 3, may be termed calk bearing members in that they have formed with the side bars 6 thereof and longitudinally arranged thereon triangular cross sectionally shaped calks 10, to present a ground penetrating edge 11.

The plate links, as shown in Figure 4, may be termed connecting plate links, and include side bars and end cross pieces similar to the calk bearing members, to provide slots 12. Extending from one of the side bars of the connecting plate links is a semi-circular eye member 13, while extending from the opposite side bar is a substantially U-shaped eye member 14.

The calk bearing members of the intermediate chains 3 are connected together in end to end relation in pairs, by connecting strip links 4, and strip links connect the outer ends of the pairs to the ends of connecting plate links which are likewise connected to the link cross chains 2 through the medium of the semi-circular eye members 13, while the calk bearing members that form the cross chains 5 are likewise connected in pairs, by connecting strip links 4, with the ends of the pairs connected to the U-shaped eye members 14 by connecting strip links.

It will be seen that connecting plate links are used to connect the intermediate chains 3 with the cross chains 5, as well as the intermediate chains with the side chains 1, through the medium of the link cross chains 2, and as the connecting plate links do not have ground engaging means formed thereon, they will not interfere with the proper function of the ground engaging means that are provided by the calks 10.

From the above description and disclosure of the drawing, it will be obvious that I have provided an antiskid chain that not only prevents lateral skidding, but due to the calk bearing members, ample traction is provided, as it will be apparent that the calks have a tendency to penetrate the roadway, therefore, skidding is eliminated and traction assured.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

An antiskid chain comprising side chains, intermediate chains between the side chains and including calk bearing members, connecting strip links securing the calk bearing members in pairs, connecting plate links included in the intermediate chains and connected to the ends of the pairs of the calk bearing members, semi-circular eye members secured to the outer sides of the connecting plate links and U-shaped eye members secured to the inner sides thereof, link cross chains connecting the intermediate chains to the side chains and being secured to the semi-circular eye members, cross chains including calk bearing members connected in pairs, and means for securing the last mentioned cross chains between the intermediate chains and to the U-shaped eye members of the connecting plate links.

BRAINARD H. MESSERSMITH.